United States Patent
Mehrabani

(10) Patent No.: US 8,576,933 B2
(45) Date of Patent: Nov. 5, 2013

(54) APPARATUS AND METHOD FOR SELECTIVE SINGLE-CARRIER EQUALIZATION

(75) Inventor: Alireza Tarighat Mehrabani, Laguna Beach, CA (US)

(73) Assignee: Broadcom Corporation, Irvine, CA (US)

(*) Notice: Subject to any disclaimer, the term of this patent is extended or adjusted under 35 U.S.C. 154(b) by 301 days.

(21) Appl. No.: 13/158,577

(22) Filed: Jun. 13, 2011

(65) Prior Publication Data

US 2012/0314750 A1    Dec. 13, 2012

(51) Int. Cl.
*H04L 27/28* (2006.01)
*H04K 1/10* (2006.01)

(52) U.S. Cl.
USPC ........... 375/260; 375/229; 375/233; 375/316; 375/324; 375/347

(58) Field of Classification Search
USPC .................. 375/260, 316, 324, 340, 229, 233
See application file for complete search history.

(56) References Cited

U.S. PATENT DOCUMENTS

2009/0185612 A1* 7/2009 McKown ............... 375/232
2009/0323796 A1* 12/2009 Futatsugi et al. ........ 375/232

* cited by examiner

*Primary Examiner* — Ted Wang
(74) *Attorney, Agent, or Firm* — Sterne, Kessler, Goldstein & Fox, P.L.L.C.

(57) ABSTRACT

Embodiments of an apparatus and method for selective SC equalization are provided. Multipath propagation in a communication channel often changes, and the severity of multipath propagation is often below worst case conditions supported by a SC communication device. When multipath propagation is less severe and below worst conditions, the use of FDE in a SC receiver to mitigate ISI can be overkill and can result in excess power being consumed. The excess power consumption can be attributed to the general inability of the structure used to perform FDE to scale in terms of performance with channel conditions. Embodiments of the apparatus and method for performing selective equalization in a SC receiver allow either FDE or TDE to be performed based on the current multipath propagation conditions of a communication channel. In general, TDE is used in place of FDE to conserve power when channel conditions permit.

21 Claims, 5 Drawing Sheets

APPARATUS AND METHOD FOR SELECTIVE SINGLE-CARRIER EQUALIZATION

FIELD OF THE INVENTION

This application relates generally to channel equalization for receivers and more particularly to selective channel equalization for single-carrier receivers.

BACKGROUND

Communication systems are designed to transfer information between two devices over a channel in the presence of disturbing influences. Intersymbol interference (ISI) is one well-known disturbing influence in which transmitted symbols become elongated and interfere with adjacently transmitted symbols. This spreading or "smearing" of symbols is generally caused by multipath propagation within those channels. Because ISI has the same effect as noise, communication is made less reliable.

One of the most basic solutions for mitigating the effects of ISI is slowing down the speed at which symbols are transmitted over a channel. More specifically, the transmission speed can be slowed down such that a symbol is only transmitted after allowing previously transmitted symbol pulses to dissipate. The time it takes for a transmitted symbol pulse to dissipate is called delay spread, whereas the original time of the symbol pulse (including any time before the next symbol pulse is transmitted) is called the symbol time. No ISI will occur if the delay spread is less than or equal to the symbol time. Although slowing down the symbol rate can eliminate or reduce the effects of ISI, it is generally an unacceptable solution for many of today's bandwidth intensive communication applications, such as those involving the transfer of multimedia content.

Orthogonal frequency division multiplexing (OFDM) is a multicarrier communication scheme that builds on this basic solution of slowing down the symbol rate to mitigate ISI. In an OFDM communication system, a plurality of orthogonal sub-carriers are transmitted over a single channel at the same time. The symbol rate of the communication system can be divided among the sub-carriers, allowing the symbol time to be increased and, thus, the effects of ISI to be reduced and more easily compensated for using equalization. Although OFDM provides a good solution for ISI mitigation, it suffers from several drawbacks, including a high peak-to-average power ratio (PAPR), which limits the efficiency of power amplifiers used in OFDM communication devices.

An alternative to OFDM that does not suffer from a high PAPR is single-carrier (SC) modulation combined with frequency-domain equalization (FDE). A SC communication device transmits and receives a SC modulated by symbols that each convey one or more bits of information. FDE is a filtering process that is used to flatten the frequency response of the channel over which the SC is transmitted to mitigate the effects of ISI. In general, FDE is performed on a block of symbols received via the SC and involves a fast Fourier transform (FFT) of the block of symbols and a channel inversion operation. More specifically, the FFT converts a time domain block of symbols received via the SC into a frequency domain signal, which is then equalized by multiplying it point-by-point by an estimate of the inverse frequency response of the channel. SC modulation combined with FDE is an effective technique for reducing the effects of ISI and delivers performance in line with OFDM, even for channels with long delay spread (i.e., channels with long impulse responses).

However, one drawback of SC communication devices that use FDE to mitigate ISI is that the structure used to perform FDE generally does not scale in terms of performance with changing channel conditions. As a result, FDE is generally always performed under the assumption of worst case channel conditions. Because multipath propagation of a channel often changes and is often below worst case conditions, FDE is often performed in SC communication devices at a level beyond what is required at the cost of excess power being consumed. For example, at any given point in time the multipath conditions of a channel may not be severe and may result in a short delay spread. Under these conditions, a SC communication device receiving information over the channel and using FDE to mitigate ISI may be performing and consuming power beyond what is required to properly recover the information. Since power consumption is often critical in SC communication devices that may be dependent on batteries, for example, any excess power consumed decreases the utility of these devices.

Another drawback of SC communication devices that use FDE to mitigate ISI is that the structure used to perform FDE generally does not scale in terms of performance with the signal-to-noise ratio (SNR) requirement of the receiver (i.e. with the SNR required or desired for properly recovering information modulated onto a SC), which is often dynamic. For example, the SNR requirement of the receiver can change based on the constellation order of the digital modulation scheme used to modulate the SC. If an SC communication device that uses FDE to mitigate ISI is currently receiving a SC modulated in accordance with a digital modulation scheme having a relatively low-order constellation (e.g., BPSK or QPSK), FDE likely will be performed in the SC communication device at a level beyond what is required at the cost of excess power being consumed.

Therefore, what is needed is an apparatus and method for reducing the power consumption of a SC communication device that uses FDE when multipath propagation conditions of the channel permit or when the dynamic SNR requirement of the SC communication device permits.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

As discussed above, multipath propagation in a communication channel often changes, and the severity of multipath propagation is often below worst case conditions supported by a SC communication device. When multipath propagation is less severe and below worst case conditions, the use of FDE in a SC receiver to mitigate ISI can be overkill and can result in excess power being consumed. The excess power consumption can be attributed to the general inability of the structure used to perform FDE to scale in terms of performance with channel conditions. Described below is an apparatus and method for performing selective equalization in a SC receiver that allows either FDE or time-domain equalization (TDE) to be performed based on the current multipath propagation conditions of a communication channel (or based on the dynamic SNR requirement of the SC communication device). In general, TDE can be used in place of FDE to conserve power when channel conditions permit.

Exemplary SC Receiver with Selective Equalization

Figure 1:
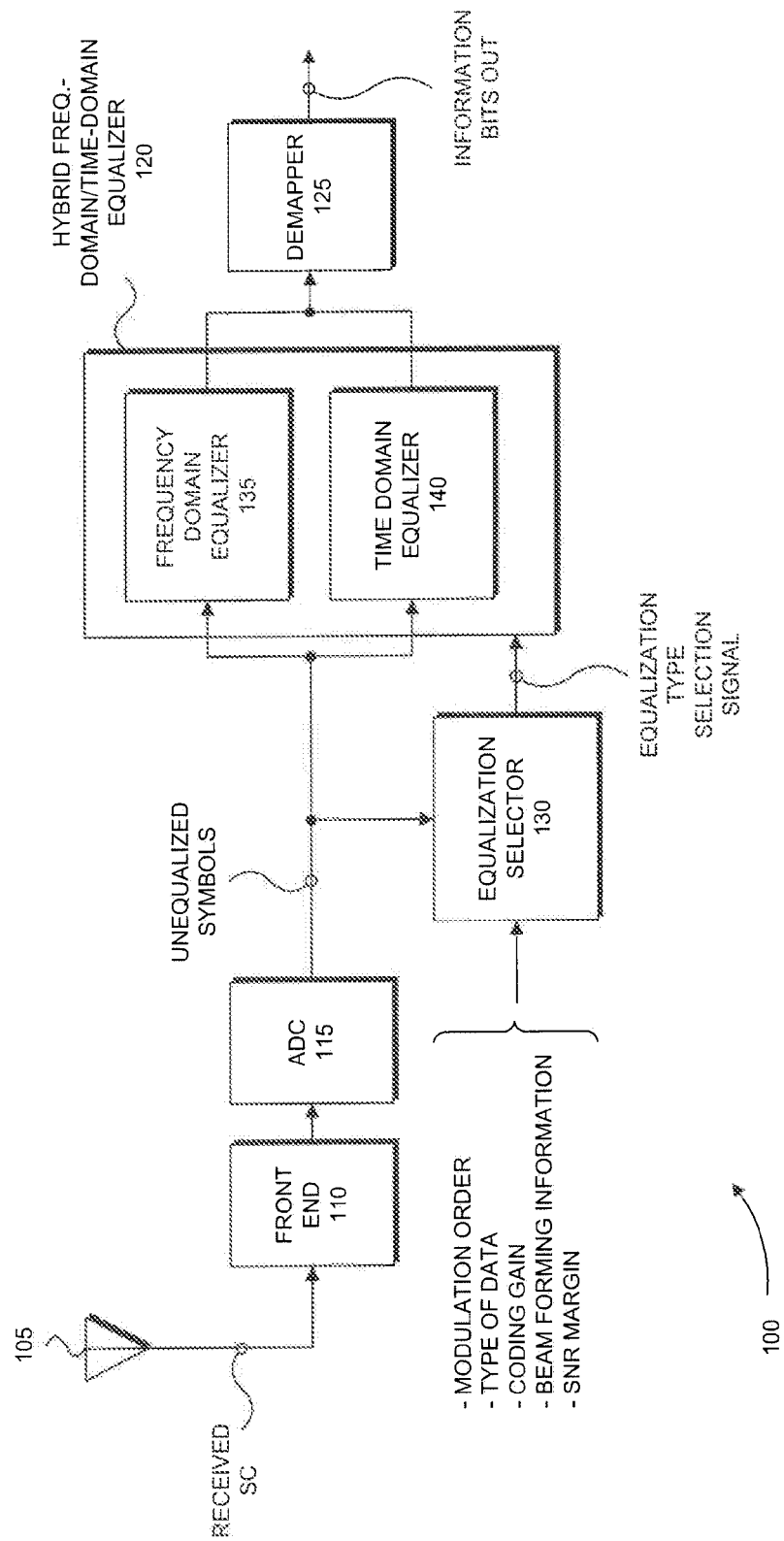
FIG. 1 illustrates a SC receiver with selective equalization, according to embodiments of the present invention.

FIG. 1 illustrates a SC receiver 100 configured to selectively perform either FDE or TDE, according to embodiments of the present invention. SC receiver 100 can be used within several different devices, including mobile phones, personal digital assistants, laptops, set-top boxes, and routers, to name a few. As illustrated in FIG. 1, SC receiver 100 includes an antenna 105, a front end 110, an analog-to-digital converter (ADC) 115, a hybrid frequency-domain/time-domain equalizer 120, a demapper 125, and an equalization selector 130.

In operation, antenna 105 is configured to receive a SC modulated with information, such as video, audio, and data, over a multipath propagation channel. Front end 110 performs down-conversion and filtering of the received SC and outputs a baseband signal. The baseband signal is then converted to a digital signal comprising a series of unequalized symbols that each convey one or more bits of information. In another embodiment of SC receiver 100, ADC 115 is positioned prior to front end 110 and down conversion and filtering are performed in the digital domain.

After being provided by ADC 115, the unequalized symbols are processed by hybrid frequency-domain/time-domain equalizer 120 to mitigate ISI caused by multipath propagation of the channel. Hybrid frequency-domain/time-domain equalizer 120 includes hardware configured to perform either FDE or TDE on the symbols. More specifically, hybrid frequency-domain/time-domain equalizer 125 is configured to perform either FDE using frequency-domain equalizer 135 or TDE using time-domain equalizer 140 at any given point in time based on an equalization type selection signal generated by equalization selector 130.

Time-domain equalizer 140 is specifically configured to perform ISI mitigation using a filter (not shown), such as a transversal filter. In order to effectively mitigate ISI, the number of taps of the filter is usually required to be on the order of the number of data symbols spanned by the delay spread of the communication channel. Therefore, for a channel with a current delay spread that is large, the complexity and power consumption of time-domain equalizer 140 can become exorbitant. In these instances, when multipath propagation is severe and delay spread is large, frequency-domain equalizer 135 can be utilized to reduce complexity and save power. However, for a channel that currently has a small delay spread, time-domain equalizer 140 can be utilized with less complexity and power consumption than frequency-domain equalizer 135.

If fact, the filter of time-domain equalizer 140 can be made to have a programmable number of filter taps such that the filter can be programmed to use a custom number of filter taps based on a current estimate of the delay spread. For example, the filter of time-domain equalizer 140 can be programmed to use less filter taps when there is less delay spread and more filter taps when there is more delay spread. In this way, additional power can be conserved because signals going to unused filters taps can be gated (e.g., any clock signal going to the unused filter taps can be gated) to reduce dynamic power consumption.

In one embodiment, equalization selector 130 is configured to receive and process the unequalized symbols from ADC 115 to generate an estimate of the delay spread of the communication channel. If the number of data symbols spanned by the delay spread of the channel is above a certain threshold, equalization selector 130 can signal to hybrid frequency-domain/time-domain equalizer 120, via the equalization type selection signal, to perform FDE using frequency-domain equalizer 135. If, on the other hand, the number of data symbols spanned by the delay spread of the communication channel is below the threshold, equalization selector 130 can signal to hybrid frequency-domain/time-domain equalizer 120, via the equalization type selection signal, to perform TDE using time-domain equalizer 140. The threshold can be determined based on when the power consumption of time-domain equalizer 140 becomes greater than the power consumption of frequency-domain equalizer 135 for a given number of data symbols spanned by the delay spread.

In another embodiment, equalization selector 130 is configured to receive and process information related to beamforming performed by SC receiver 100 and/or the transmitter transmitting the SC. In general, beamforming can be used to effectively reduce the delay spread of the channel. Therefore, based on the availability and degree of beamforming performed by SC receiver 100 and/or the transmitter transmitting the SC, equalization selector 130 can signal to hybrid frequency-domain/time-domain equalizer 120, via the equalization type selection signal, to perform FDE using frequency-domain equalizer 135 or TDE using time-domain equalizer 140. More specifically, in the presence of good beamforming, equalization selector 130 can signal to hybrid frequency-domain/time-domain equalizer 120, via the equalization type selection signal, to perform TDE using time-domain equalizer 140 to conserve power, and in other instances, to perform FDE using frequency-domain equalizer 135.

In yet another embodiment, equalization selector 130 is configured to receive and process the unequalized symbols from ADC 115 to generate an estimate of the frequency response and/or impulse response of the communication channel. For example, equalization selector 130 can estimate the frequency and/or impulse response of the channel over which the SC is received using a channel estimation method. The channel estimation method can be a training-based method or a blind method and can use either maximum likelihood estimation or minimum mean square error estimation, for example. This estimated response of the channel includes information related to (and is therefore dependent on) the delay spread of the communication channel and can be used to determine an estimate of the signal-to-noise ratio (SNR) of the SC received by SC receiver 100 after having being processed by frequency-domain equalizer 135 or time-domain equalizer 140. This estimated SNR can be referred to as an effective SNR of the received SC for a given channel estimate determined and equalization scheme performed.

For example, equalization selector 130 can determine the effective SNR of a SC received by receiver 100, for a given channel estimate, after having been processed by time-domain equalizer 140. In fact, equalization selector 130 can perform the same estimation for several different configurations of time-domain equalizer 140, each with a different number of taps being used by the filter performing TDE. Equalization selector 130 can further determine the effective SNR of the SC, for the same channel estimate, after having been processed by frequency-domain equalizer 135. These estimates can then be used to determine whether time-domain equalizer 140 is sufficient to process a received SC or whether frequency-domain equalizer 135 is required.

More specifically, given a required SNR that represents a required or desired SNR for properly recovering information modulated onto a SC received by SC receiver 100, a comparison can be made between the required SNR and the effective SNR of the SC after being processed by time-domain equalizer 140. If the effective SNR of the SC after being processed by time-domain equalizer 140 is expected to be greater than the required SNR, time-domain equalizer 140 can be used to perform equalization. If, on the other hand, the effective SNR of the SC after being processed by time-domain equalizer 140 is expected to be less than the required SNR, frequency-domain equalizer 135 can be used in place of time-domain equalizer 140.

In an embodiment, equalization selector 130 can be further configured to calculate the required SNR based on one or more conditions. For example, equalization selector 130 can determine the required SNR based on the constellation order of the digital modulation scheme used to modulate the SC. In general, the higher the order constellation used in the digital modulation of a carrier, such as the SC received by SC receiver 100, the higher the required SNR imposed at the receiver in order to reliably demodulate the carrier-signal and recover the transmitted information. Thus, the required SNR can be determined to be greater for digital modulation schemes with higher order constellations than for digital modulation schemes with lower order constellations.

In another example, equalization selector 130 can determine the required SNR based on the type of information modulated onto the SC. For example, certain types of information such as video, audio, and data may be able to tolerate different amounts of lost or corrupted information or different amounts of delay in receiving the information transmitted over the channel. These differences can dictate different levels of required SNR for each of the different types of information modulated onto the SC.

In yet another example, equalization selector 130 can determine the required SNR based on a code rate used to encode the information modulated onto the SC. More specifically, prior to transmission, a transmitter can add redundant information to the information modulated onto the SC. The redundant information is typically a complex function of a portion, or group, of the original information bits, and allows for forward error correction (FEC) to be performed at a receiving system, such as SC receiver 100. FEC enables a receiving system to detect and correct for errors caused by corruption from the channel and receiver. The total amount of useful information sent, i.e. non-redundant information, is typically defined by the code rate, k/n; for every k bits of useful information, n bits of information are generated. Consequently, increasing the code rate invariably increases the data rate. However, a higher code rate imposes a higher SNR requirement at the receiver in order to reliable demodulate received signals. Thus, equalization selector 130 can determine the required SNR, at least in part, based on the code rate used to encode the information modulated onto the SC.

In a final example, equalization selector 130 can determine the required SNR based on information related to beamforming performed by SC receiver 100 and/or the transmitter transmitting the SC. For example, the information related to beamforming can be in the form of a gain realized by performing beamforming compared to omnidirectional reception or transmission.

It should be further noted that equalization selector 130 can further add an additional SNR margin to any required SNR determined to better ensure proper recovery of information modulated onto the SC received by SC receiver 100.

After equalization selector 130 determines which form of equalization is to be performed, the unequalized symbols can be equalized by hybrid frequency-domain/time-domain 120. The equalized symbols produced by hybrid frequency-domain/time-domain 120 can then be provided to demapper 125. Demapper 125, in the case of complex symbols, uses the phase and magnitude information of each symbol and makes a decision as to which combination of one or more bits the transmitter sent based on the digital modulation scheme used by the transmitter (e.g., 64-QAM, 256-QAM, etc.). Demapper 125 can perform either hard decision decoding or soft decision decoding.

Exemplary Frequency-Domain Equalizer

Figure 2:
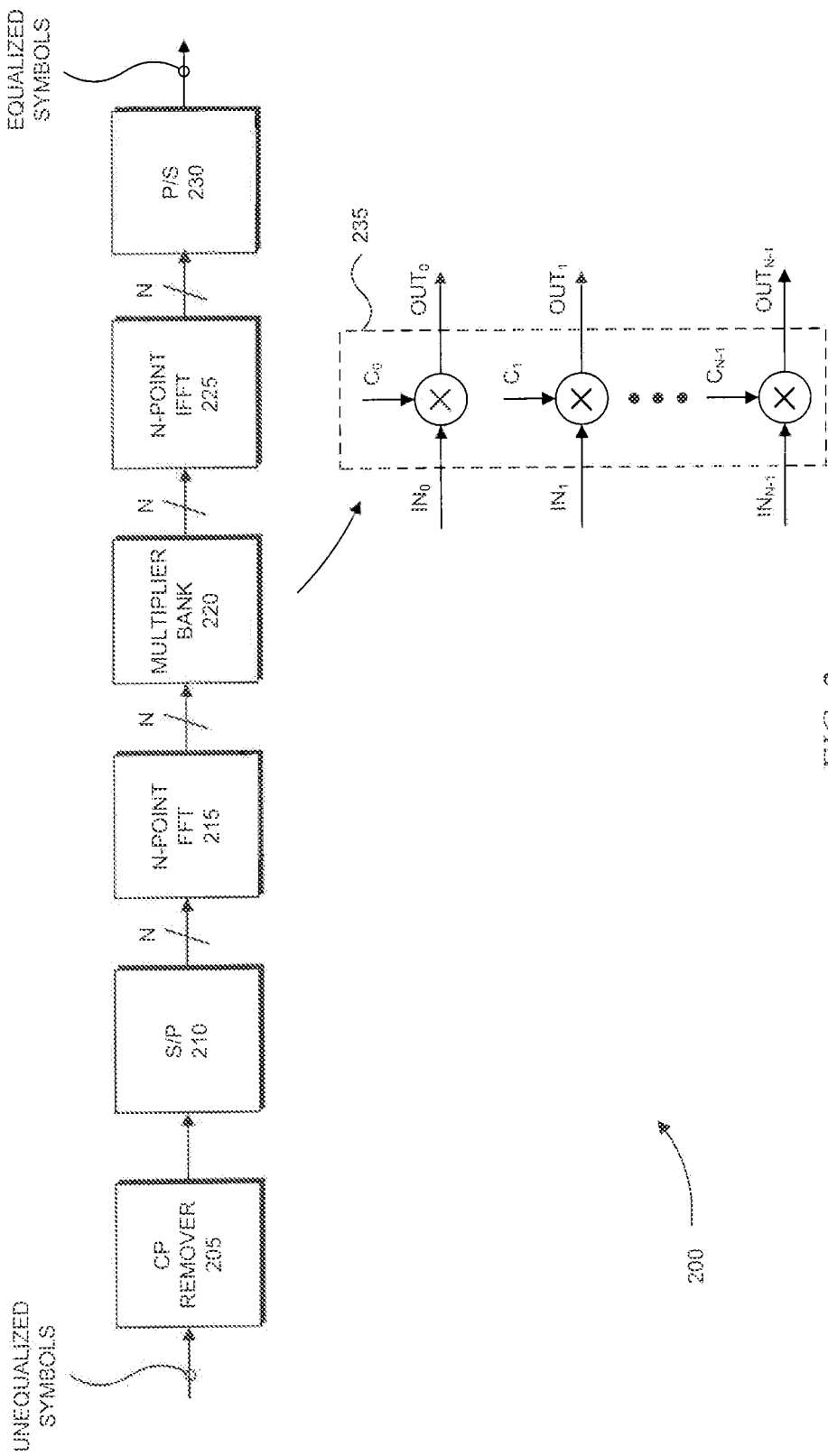
FIG. 2 illustrates a frequency-domain equalizer, according to embodiments of the present invention.

FIG. 2 illustrates an exemplary frequency-domain equalizer 200 that can be implemented in SC receiver 100 illustrated in FIG. 1, according to embodiments of the present invention. As illustrated in FIG. 2, frequency-domain equalizer 200 includes a cyclic prefix (CP) remover 205, a serial-to-parallel module 210, an N-point FFT 215, a complex multiplier bank 220, an N-point IFFT 225, and a parallel-to-serial module 230.

In operation, frequency-domain equalizer 200 is configured to perform FDE on a group of noisy symbols that were recovered from a SC transmitted over a multipath propagation channel. For each group of noisy symbols, cyclic prefix samples are removed by CP remover 205 and the resulting group of symbols is sent to serial-to-parallel module 210. Serial-to-parallel module 210 converts the block of symbols into N-parallel symbols for processing by N-point FFT 215. N-point FFT 215 converts the finite duration sequence of N symbols into an N-point frequency-domain signal, where each point of the N-point frequency-domain signal represents a specific frequency component of the finite duration sequence of N symbols. The integer value N is usually chosen in the range of 64-2048 for SC communication systems. The N-point frequency-domain signal is then sent to complex multiplier bank 220 for further processing.

A more detailed example implementation 235 of complex multiplier bank 220 is provided in the bottom right hand corner of FIG. 2. Each frequency component of the N-point frequency-domain signal (denoted by $IN_0$-$IN_{N-1}$) is multiplied by a coefficient (denoted by $C_0$-$C_{N-1}$). The resulting output (denoted by $OUT_0$-$OUT_{N-1}$) represents the equalized N-point frequency-domain signal. The coefficient values are determined so as to flatten the frequency response of the multipath propagation channel. More specifically, each coefficient value is generally determined solely as a function of the channel frequency response at the corresponding frequency of the coefficient. Because each coefficient is generally determined solely as a function of the channel frequency response, the complexity of frequency-domain equalizer 200 generally does not scale with the delay spread of the channel.

After channel distortion has been compensated for by multiplier bank 220, the N-point frequency-domain signal is brought back into the time-domain by N-point IFFT 225. The parallel, time-domain signal of N symbols produced by N-point IFFT 225 is then re-serialized by parallel-to-serial module 230.

Exemplary Time-Domain Equalizer

Figure 3:
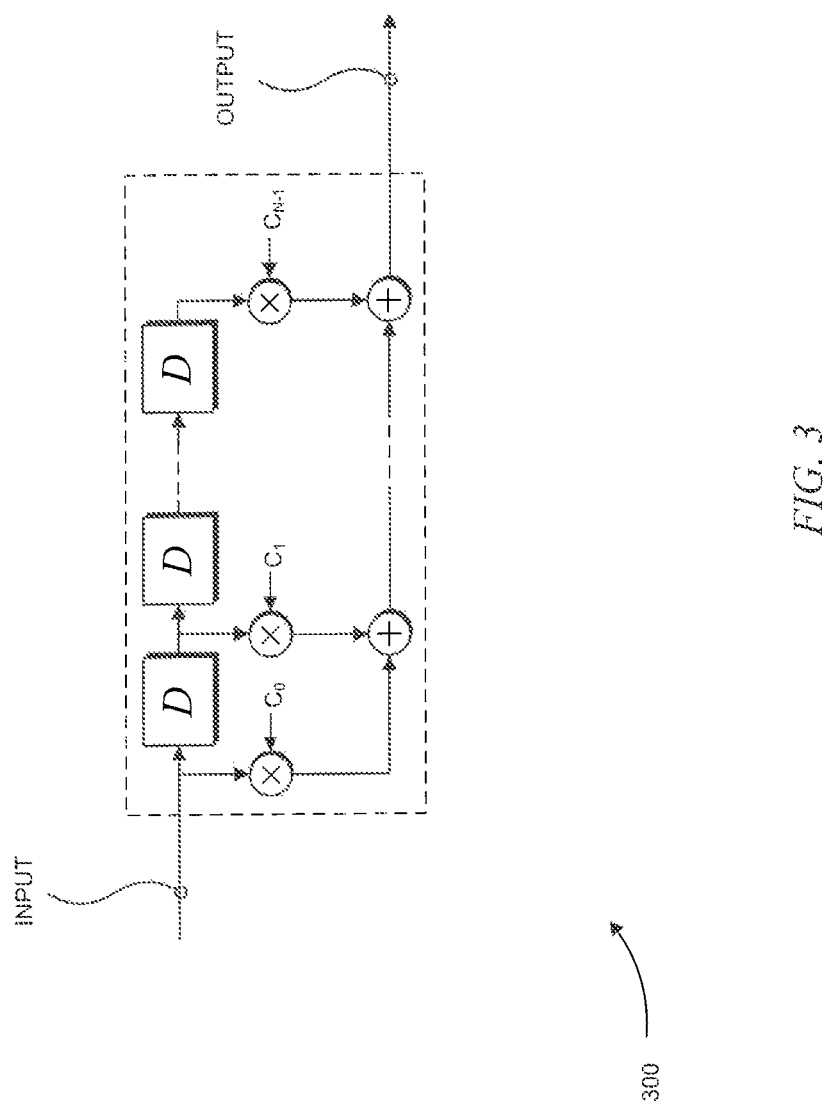
FIG. 3 illustrates a time-domain equalizer, according to embodiments of the present invention.

FIG. 3 illustrates an exemplary time-domain equalizer 300 that can be implemented in SC receiver 100 illustrated in FIG. 1, according to embodiments of the present invention. As illustrated in FIG. 3, time-domain equalizer 300 is implemented as an finite impulse response (FIR), transversal filter that includes one or more continuous-time delay elements denoted by the symbol D and one or more taps (i.e., multipliers). The delay elements are cascaded to store and shift, for example, successive noisy symbols that were recovered from a SC transmitted over a multipath propagation channel.

Time-domain equalizer 300 can include as few as one delay element and tap or up to N delay elements and taps. In one embodiment, the number of taps used by time-domain equalizer 300 to perform time-domain equalization is programmable. If fact, the filter of time-domain equalizer 300 can be made to have a programmable number of taps such that the filter can be programmed to use a custom number of taps based on the current delay spread of the multipath propagation channel. For example, the filter of time-domain equalizer 300 can be programmed to use less filter taps when there is less delay spread and more taps when there is more delay spread. In this way, additional power can be conserved because signals going to unused taps can be gated (e.g., any clock signal going to the unused taps can be gated) to reduce dynamic power consumption.

The filter of time-domain equalizer 300 can be used in a number of different time-domain equalizer configurations, including a feed-forward equalizer (FFE) configuration and a decision feedback equalizer (DFE) configuration as will be recognized by one of ordinary skill in the art. For example, in a FFE configuration, a current symbol being processed by the filter of time-domain equalizer 300 is stored in the last delay element in the chain of delay elements, whereas future symbols (i.e., symbols transmitted and received after the current symbol) are stored in the remaining delay elements. The future symbols stored in the delay elements and just received are multiplied by respective tap weights $C_0$-$C_{N-2}$. The tap weights are related to the extent of precursor ISI contributed by the future symbols. For example, tap weight $C_1$ represents a good approximation of the amount of precursor ISI contributed by the future symbol stored in the first delay element illustrated farthest to the left in FIG. 3.

The resulting products of the multipliers are subtracted from the current symbol being processed to substantially eliminate precursor ISI from that symbol. The current symbol, as illustrated in FIG. 3, can be further multiplied by a tap weight $C_{N-1}$. The tap weights can be determined by an adaptation engine (not shown) and can be continually adapted by the adaptation engine to change with the conditions of the channel over which the information is received.

Exemplary Equalization Selector

Figure 4:
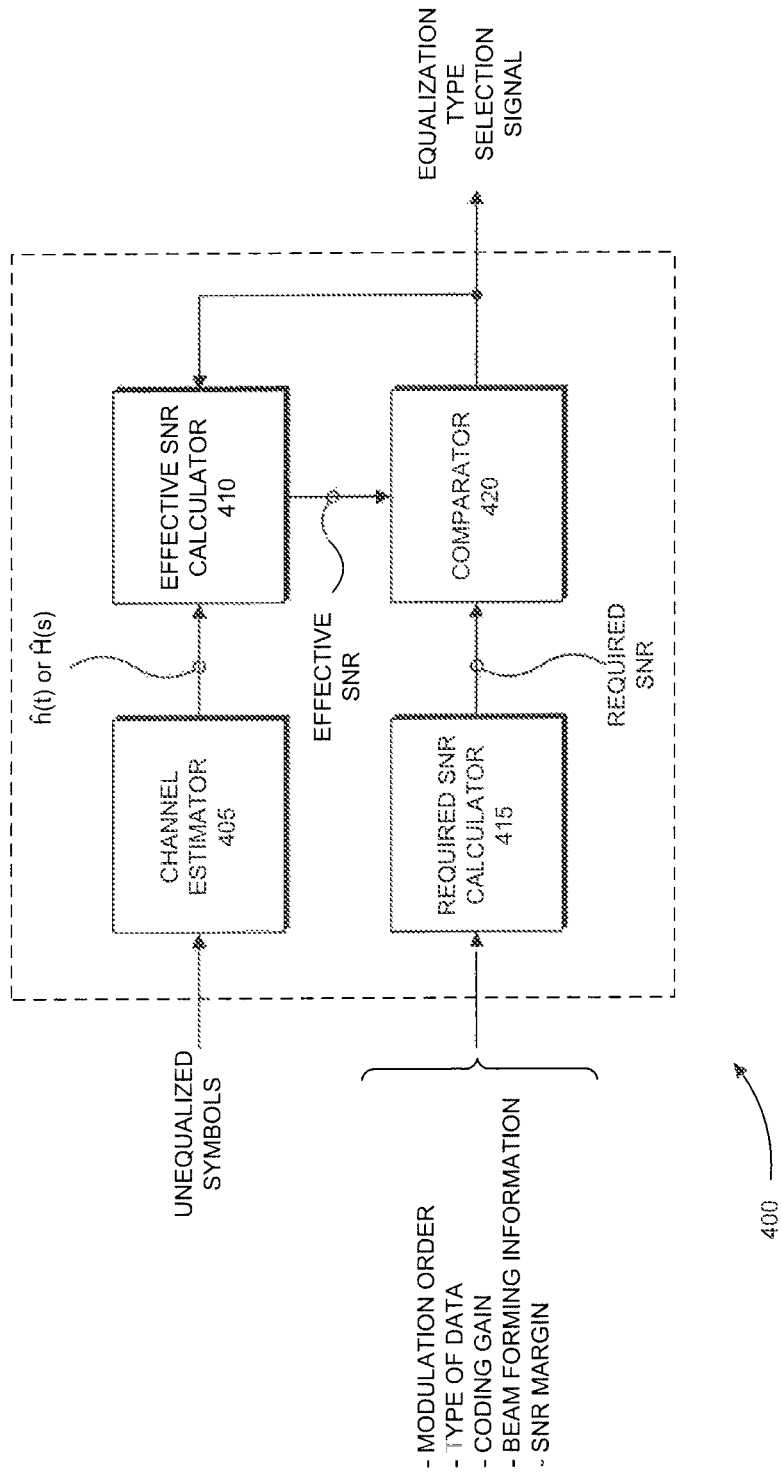
FIG. 4 illustrates an equalization selector, according to embodiments of the present invention.

FIG. 4 illustrates an equalization selector 400 that can be implemented in SC receiver 100 illustrated in FIG. 1, according to embodiments of the present invention. Equalization selector 400 represents one embodiment of equalization selector 130 illustrated in FIG. 1. As illustrated in FIG. 4, equalization selector 400 includes a channel estimator 405, an effective SNR calculator 410, a required SNR calculator 415, and a comparator 420.

In operation, channel estimator 405 is configured to receive and process unequalized symbols that were recovered from a SC transmitted over a multipath propagation channel to generate an estimate of the frequency response and/or impulse response of the channel. For example, channel estimator 405 can estimate the frequency and/or impulse response of the channel over which the SC is received using a channel estimation method. The channel estimation method can be a training-based method or a blind method and can use either maximum likelihood estimation or minimum mean square error estimation, for example.

This estimated response of the channel includes information related to the delay spread of the communication channel and is used by effective SNR calculator 410 to determine an estimate of the signal-to-noise ratio (SNR) of the SC after having being processed by frequency-domain equalizer 135 or time-domain equalizer 140, as illustrated in FIG. 1. This estimated SNR can be referred to as an effective SNR of the received SC for a given channel estimate determined and equalization scheme performed.

For example, effective SNR calculator 410 can determine the effective SNR of a SC received, for a given channel estimate, after having been processed by time-domain equalizer 140. In fact, equalization selector 130 can perform the same estimation for several different configurations of time-domain equalizer 140, each with a different number of taps being used by the filter performing TDE. SNR calculator 140 can further determine the effective SNR of the SC, for the same channel estimate, after having been processed by frequency-domain equalizer 135.

These estimates can then be used by comparator 420 to determine whether time-domain equalizer 140 is sufficient to process a received SC or whether frequency-domain equalizer 135 is required. More specifically, given a required SNR that represents a required or desired SNR for properly recovering information modulated onto a SC received, comparator 420 can compare the required SNR and the effective SNR of the SC after being processed by time-domain equalizer 140. If the effective SNR of the SC after being processed by time-domain equalizer 140 is expected to be greater than the required SNR, time-domain equalizer 140 (with a given number of taps) can be used to perform equalization. If, on the other hand, the effective SNR of the SC after being processed by time-domain equalizer 140 is expected to be less than the required SNR, frequency-domain equalizer 135 can be used in place of time-domain equalize 140 (or time-domain equalizer 140 with more taps being used to perform TDE).

Required SNR calculator 415 is configured to calculate the required SNR based on one or more conditions. For example, required SNR calculator can determine the required SNR based on the constellation order of the digital modulation scheme used to modulate the SC received. In general, the higher the order constellation used in the digital modulation of a carrier, such as the SC received, the higher the required SNR imposed at the receiver in order to reliably demodulate the carrier-signal and recover the transmitted information. Thus, the required SNR can be determined to be greater for digital modulation schemes with higher order constellations than for digital modulation schemes with lower order constellations.

In another example, required SNR calculator 415 can determine the required SNR based on the type of information modulated onto the SC received. For example, certain types of information such as video, audio, and data may be able to tolerate different amounts of lost or corrupted information or different amounts of delay in receiving the information transmitted over the channel. These differences can dictate different levels of required SNR for each of the different types of information modulated onto the SC.

In yet another example, required SNR calculator 415 can determine the required SNR based on a code rate used to encode the information modulated onto the SC received. More specifically, prior to transmission, a transmitter can add redundant information to the information modulated onto the SC received. The redundant information is typically a complex function of a portion, or group, of the original information bits, and allows for forward error correction (FEC) to be performed at a receiving system, such as SC receiver 100 illustrated in FIG. 1. FEC enables a receiving system to detect and correct for errors caused by corruption from the channel and receiver. The total amount of useful information sent, i.e. non-redundant information, is typically defined by the code rate, k/n; for every k bits of useful information, n bits of information are generated. Consequently, increasing the code rate invariably increases the data rate. However, a higher code rate imposes a higher SNR requirement at the receiver in order to reliable demodulate received signals. Thus, required SNR calculator 415 can determine the required SNR, at least in part, based on the code rate used to encode the information modulated onto the SC.

In a final example, required SNR calculator 415 can determine the required SNR based on information related to beamforming performed by the SC receiver receiving the SC and/or the transmitter transmitting the SC. For example, the information related to beamforming can be in the form of a gain realized by performing beamforming compared to omni-directional reception or transmission.

It should be further noted that required SNR calculator 415 can further add an additional SNR margin to any required SNR determined to better ensure proper recovery of information modulated onto the SC received.

Exemplary Method for Performing Selective Equalization

Figure 5:
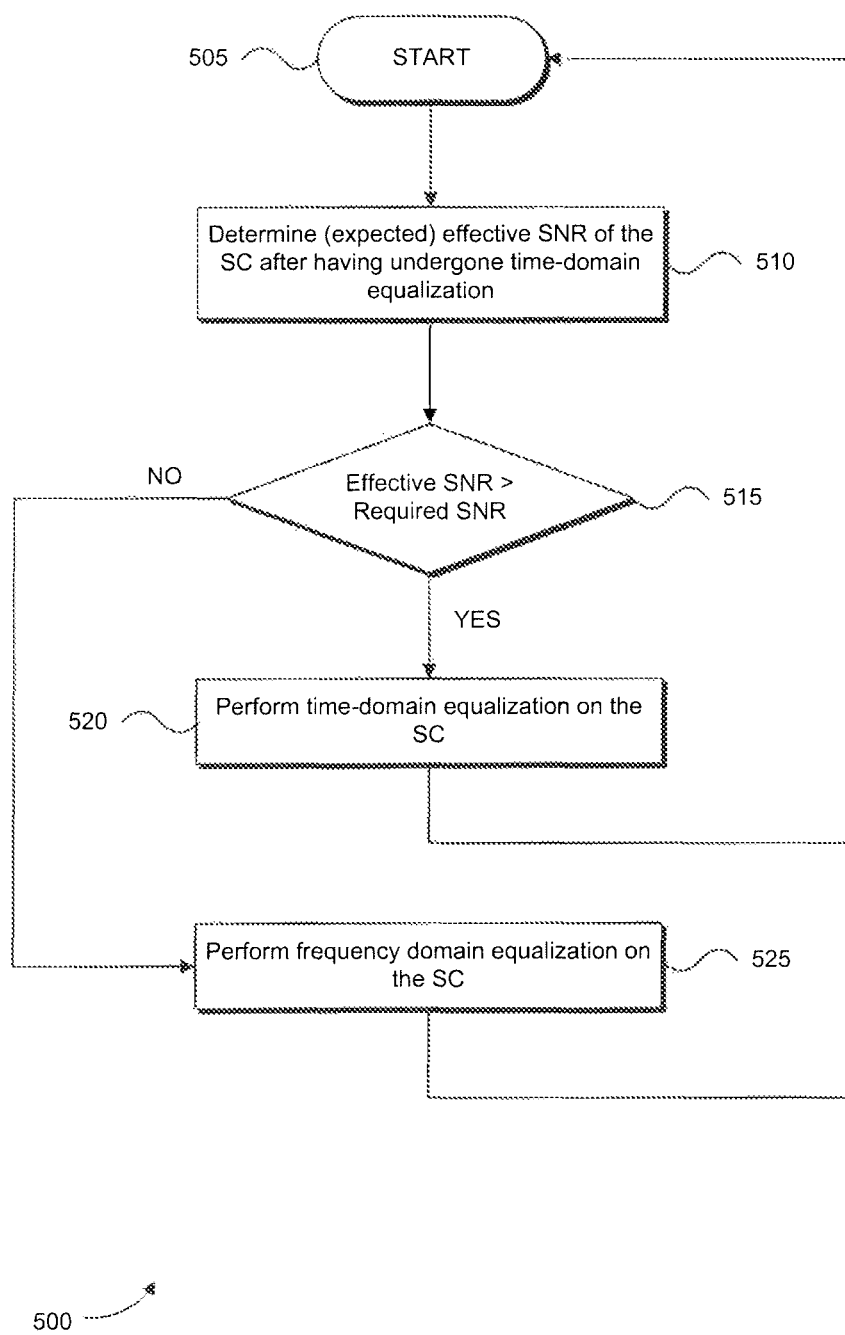
FIG. 5 illustrates a flowchart of a method for performing selective equalization on a single-carrier (SC) received over a multipath propagation channel, according to embodiments of the present invention.

FIG. 5 illustrates a flowchart 500 of a method for performing selective equalization on a single-carrier (SC) received over a multipath propagation channel, according to embodiments of the present invention. Flowchart 500 is described with continued reference to the exemplary SC receiver 100 depicted in FIG. 1. However, flowchart 500 is not limited to that embodiment. Note that some steps in flowchart 500 do not have to occur in the order shown or discussed below.

Flowchart 500 starts at step 505 and transitions to step 510. In step 510, an effective SNR of the SC after having undergone TDE by time-domain equalizer 140 is determined. This determination can be performed for several different configurations of time-domain equalizer 140, each with a different number of taps being used by the filter performing TDE.

After step 510, the effective SNR(s) determined in step 510 are compared to a required SNR. The required SNR can be determined according any number of conditions as discussed above. If the effective SNR is greater than the required SNR, flowchart 500 proceeds to step 520. Else, flowchart 500 proceeds to step 525.

In one embodiment, for multiple different effective SNRs determined in step 510, each of which corresponds to a different configuration of time-domain equalizer 140 using a different number of taps, the different effective SNRs determined can be compared in step 515 starting with the effective SNR corresponding to the configuration of time-domain equalizer 140 using the least number of taps and working up to the effective SNR corresponding to the configuration of time-domain equalizer 140 using the most number of taps to perform TDE. Once an effective SNR is determined to be greater than the required SNR in step 515, flowchart 500 can transition without making any additional comparisons. However, if after having going through each determined SNR calculated in step 510 and comparing them with the required SNR and none of the determined SNRs are greater than the required SNR, flowchart 500 transitions to step 525.

Assuming a determined effective SNR is greater than the required SNR, flowchart 500 transitions to step 520 and time-domain equalization is performed on the SC.

Assuming, on the other hand, that no determined effective SNR is greater than the required SNR, flowchart 500 transitions to step 525 and FDE is performed on the SC. It should be noted that, in another embodiment, an effective SNR can be determined for the SC after having undergone FDE to determine whether FDE is sufficient (i.e., that the effective SNR of the SC after having undergone FDE is greater than the required SNR) prior to step 520. If not, then the SC receiver can be shut down to conserve power. Else, FDE can be performed on the SC.

After steps 520 and 525, flowchart 500 returns to step 505 and the method depicted can be repeated.

It should be noted that, although the detailed description above generally described FDE and TDE based on feed-forward implementations, the present invention is not so limited. As will be appreciated by one of ordinary skill in the art, the present invention can be applied to FDE and TDE based on feed-back implementation as well.

It should be further noted that, although the detailed description above described performing equalization using either FDE or TDE, the concepts presented above can be applied more generally, as will be appreciated by one of ordinary skill in the art, to other equalization methods. For example, it is possible to apply the concepts above to select between different equalization methods, such as equalization methods EQ1, EQ2, and EQ3 where: EQ1, EQ2, and EQ3 can each represent any reasonable equalization method; EQ1 can consume power P1 and can be used for a required SNR1, EQ2 can consume power P2 and can be used for a required SNR2, and EQ3 can consume power P3 and can be used for a required SNR3. The values of SNR1, 2, and 3 can be such that SNR1<SNR2<SNR3, and the values of P1, 2, and 3 can be such that P1<P2<P3. Therefore, and in accordance with the above described concepts, depending on the required SNR and power consumption constraints, one of the equalization methods EQ1, EQ1, and EQ3 can be selected.

Conclusion

It will be appreciated that the above described embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals.

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A receiver for performing selective equalization on a single-carrier (SC) received over a multipath propagation channel, the receiver comprising:
    a frequency-domain equalizer configured to perform frequency-domain equalization (FDE) on the SC to compensate for noise introduced by the multipath propagation channel;
    a time-domain equalizer configured to perform time-domain equalization (TDE) on the SC to compensate for noise introduced by the multipath propagation channel; and
    an equalization selector configured to select, based on an amount of delay spread associated with the multipath propagation channel, the frequency-domain equalizer to perform FDE on the SC or the time-domain equalizer to perform TDE on the SC.

2. The receiver of claim 1, wherein the equalization selector is configured to select the frequency-domain equalizer to perform FDE on the SC or the time-domain equalizer to perform TDE on the SC based on information relating to beamforming performed by the receiver or a transmitter transmitting the SC.

3. The receiver of claim 1, wherein the equalization selector is configured to select the time-domain equalizer to perform TDE on the SC if an effective signal to noise ratio (SNR) of the SC after being processed by the time-domain equalizer is expected to be greater than a required SNR, wherein the effective SNR is dependent on the amount of delay spread associated with the multipath propagation channel.

4. The receiver of claim 3, wherein the equalization selector is configured to select the frequency-domain equalizer to perform FDE on the SC if the effective SNR of the SC after having undergone TDE by the time-domain equalizer is expected to be less than the required SNR.

5. The receiver of claim 4, wherein the required SNR is determined based on a modulation order of a modulation scheme used to modulate the SC.

6. The receiver of claim 4, wherein the required SNR is determined based on a type of information modulated onto the SC, wherein the type of information is at least one of video and data.

7. The receiver of claim 4, wherein the required SNR is determined based on a code rate used to encode information modulated onto the SC.

8. The receiver of claim 4, wherein the required SNR is determined based on information relating to beamforming performed by the receiver or a transmitter transmitting the SC.

9. The receiver of claim 3, wherein the effective SNR is further dependent on a number of filter taps used by the time-domain equalizer to perform TDE on the SC.

10. The receiver of claim 9, wherein, if the equalization selector selects the time-domain equalizer to perform TDE on the SC, the equalization selector further programs the time-domain equalizer to use a least number of filter taps to perform TDE on the SC that still provides for an effective SNR greater than the required SNR.

11. A method for performing selective equalization on a single-carrier (SC) received over a multipath propagation channel, the method comprising:
    performing time-domain equalization (TDE) on the SC if an effective signal to noise ratio (SNR) of the SC after having undergone TDE is expected to be greater than a required SNR, wherein the effective SNR is dependent on an amount of delay spread associated with the multipath propagation channel; and
    performing frequency-domain equalization on the SC if the effective SNR of the SC after having undergone TDE by the time-domain equalizer is expected to be less than the required SNR.

12. The method of claim 11, further comprising:
    determining the required SNR based on a modulation order of a modulation scheme used to modulate the SC.

13. The method of claim 11, further comprising:
    determining the required SNR based on a type of information modulated onto the SC, wherein the type of information is at least one of video and data.

14. The method of claim 11, further comprising:
    determining the required SNR based on a code rate used to encode information modulated onto the SC.

15. The method of claim 11, further comprising:
determining the required SNR based on information relating to beamforming performed by a receiver receiving the SC or a transmitter transmitting the SC.

16. The method of claim 11, wherein the effective SNR is further dependent on a number of filter taps used by the time-domain equalizer to perform TDE on the SC.

17. The method of claim 16, further comprising:
if the effective SNR of the SC after having undergone TDE is expected to be greater than the required SNR, using a least number of filter taps to perform TDE on the SC that still provides for an effective SNR greater than the required SNR.

18. A receiver for performing selective equalization on a single-carrier (SC) received over a multipath propagation channel, the receiver comprising:
a frequency-domain equalizer configured to perform frequency-domain equalization (FDE) on the SC to compensate for noise introduced by the multipath propagation channel;
a time-domain equalizer configured to perform time-domain equalization (TDE) on the SC to compensate for noise introduced by the multipath propagation channel, wherein the time-domain equalizer uses a programmable number of filter taps to perform TDE on the SC; and
an equalization selector configured to select, based on an amount of delay spread associated with the multipath propagation channel, the frequency-domain equalizer to perform FDE on the SC or the time-domain equalizer to perform TDE on the SC.

19. The receiver of claim 18, wherein the equalization selector is configured to select the time-domain equalizer to perform TDE on the SC if an effective signal to noise ratio (SNR) of the SC after being processed by the time-domain equalizer is expected to be greater than a required SNR, wherein the effective SNR is dependent on the amount of delay spread associated with the multipath propagation channel.

20. The receiver of claim 19, wherein the equalization selector is configured to select the frequency-domain equalizer to perform FDE on the SC if the effective SNR of the SC after having being processed by the time-domain equalizer, using a maximum number of the programmable filter taps, is expected to be less than the required SNR.

21. The receiver of claim 20, wherein a power consumption associated with the time-domain equalizer using the maximum number of the programmable filter taps is less than a power consumption associated with the frequency-domain equalizer.

* * * * *

UNITED STATES PATENT AND TRADEMARK OFFICE
CERTIFICATE OF CORRECTION

PATENT NO. : 8,576,933 B2  
APPLICATION NO. : 13/158577  
DATED : November 5, 2013  
INVENTOR(S) : Alireza Tarighat Mehrabani Page 1 of 1

It is certified that error appears in the above-identified patent and that said Letters Patent is hereby corrected as shown below:

In the Specification:

Column 4, line 24 please replace "If fact, the filter" with --In fact, the filter--.

Column 6, line 36 please replace "frequency-domain/time-domain 120" with --frequency-domain/time-domain equalizer 120--.

Column 9, line 43 please replace "order to reliable demodulate" with --order to reliably demodulate--.

In the Claims:

Column 14, line 17 please replace "after having being processed" with --after having been processed--.

Signed and Sealed this  
Seventh Day of January, 2014

Margaret A. Focarino  
*Commissioner for Patents of the United States Patent and Trademark Office*